(12) United States Patent
    Garbi et al.

(10) Patent No.: US 9,892,023 B2
(45) Date of Patent: *Feb. 13, 2018

(54) SYSTEMS AND METHODS OF ANALYZING SOFTWARE SYSTEMS HAVING SERVICE COMPONENTS

(71) Applicant: Lexmark International Technology Sarl, Geneva (CH)

(72) Inventors: Richard Anthony Garbi, Blue Springs, MO (US); Sean Jeremy Riggin, Shawnee, KS (US)

(73) Assignee: KOFAX INTERNATIONAL SWITZERLAND SARL, Geneva (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/381,457

(22) Filed: Dec. 16, 2016

(65) Prior Publication Data

US 2017/0147477 A1    May 25, 2017

Related U.S. Application Data

(63) Continuation of application No. 14/164,224, filed on Jan. 26, 2014, now Pat. No. 9,558,460.

(60) Provisional application No. 61/841,164, filed on Jun. 28, 2013.

(51) Int. Cl.
| | |
|---|---|
| *H04L 12/24* | (2006.01) |
| *G06F 11/36* | (2006.01) |
| *H04L 29/08* | (2006.01) |
| *G06Q 10/06* | (2012.01) |
| *G06Q 10/10* | (2012.01) |

(52) U.S. Cl.
CPC ...... *G06F 11/3664* (2013.01); *G06F 11/3692* (2013.01); *G06Q 10/06* (2013.01); *G06Q 10/103* (2013.01); *H04L 41/06* (2013.01); *H04L 41/0627* (2013.01); *H04L 41/0631* (2013.01); *H04L 67/16* (2013.01); *H04L 67/36* (2013.01); *H04L 41/0273* (2013.01); *H04L 67/22* (2013.01)

(58) Field of Classification Search
CPC ...... G06Q 10/06; G06Q 10/103; G06Q 10/10; G06Q 10/067; G06Q 10/063112; G06Q 30/0621; G06Q 30/02; H04L 41/06; H04L 41/0627; H04L 41/0631; G06N 5/048; G06F 8/00; G06F 21/10; G06F 17/30035
See application file for complete search history.

(56) References Cited

U.S. PATENT DOCUMENTS

| | | | | |
|---|---|---|---|---|
| 7,448,022 | B1 * | 11/2008 | Ram | G06F 8/00 717/120 |
| 7,490,073 | B1 * | 2/2009 | Qureshi | G06N 5/048 706/50 |
| 2002/0147611 | A1 * | 10/2002 | Greene | G06Q 10/063112 705/1.1 |
| 2003/0229529 | A1 * | 12/2003 | Mui | G06Q 10/06 705/328 |

(Continued)

*Primary Examiner* — Le H Luu
(74) *Attorney, Agent, or Firm* — Zilka-Kotab, P.C.

(57) ABSTRACT

Systems and methods of inspecting the structure of a software system composed of a service solution provider having service components that includes analyzing the relationships between services and components, applying a fitness algorithm to ascertain characteristics of the system and its components and creating a human readable representation of the software system or software service provider.

19 Claims, 5 Drawing Sheets

(56) References Cited

U.S. PATENT DOCUMENTS

| | | | |
|---|---|---|---|
| 2004/0054690 A1* | 3/2004 | Hillerbrand | G06Q 10/06 |
| 2005/0027871 A1* | 2/2005 | Bradley | G06Q 20/1235 709/227 |
| 2005/0182773 A1* | 8/2005 | Feinsmith | G06Q 10/10 |
| 2006/0165040 A1* | 7/2006 | Rathod | G06Q 10/10 370/335 |
| 2009/0006156 A1* | 1/2009 | Hunt | G06Q 30/02 705/7.11 |
| 2010/0094878 A1* | 4/2010 | Soroca | G06F 17/30035 707/748 |
| 2011/0307348 A1* | 12/2011 | Vasing | G06Q 30/0621 705/26.5 |
| 2012/0069131 A1* | 3/2012 | Abelow | G06Q 10/067 348/14.01 |

* cited by examiner

SYSTEMS AND METHODS OF ANALYZING SOFTWARE SYSTEMS HAVING SERVICE COMPONENTS

CROSS REFERENCES TO RELATED APPLICATIONS

The present application is a continuation application and claims priority from U.S. patent application Ser. No. 14/164,224, filed Jan. 26, 2014, entitled "Methods of Analyzing Software Systems Having Service Components," which itself is related to and claims priority from U.S. provisional application No. 61/841,164, filed Jun. 28, 2013, entitled, "Methods Of Analyzing Software Systems Having Service Components." The contents of both applications are hereby incorporated by reference herein in their entirety.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present disclosure relates generally to software analysis tools for web based software systems, and more particularly to analysis tools for service based systems operating on a network.

2. Description of the Related Art

Service oriented software systems consist of various components which express capabilities and dependencies. These systems may be composed dynamically based on certain constraints established by individual components, such as versions and properties, expressed in other components. Characteristics of certain components of the system, such as inconsistencies, bugs, performance bottlenecks, may be emergent properties in the system as a whole, which can be difficult to isolate without substantial effort. As software systems become increasingly complex, the difficulty of diagnosing these problems becomes much higher.

A service registry is one of the fundamental pieces of service oriented architecture (SOA). It refers to a place in which service providers can impart information about their offered services and potential clients can search for services. This information includes the offered functionality of the services available to potential consumers (clients). A service registry allows information about services to be organized and provide facilities to publish and discover services. Universal Description Discovery and Integration (UDDI) and the Web Services Description Language (WSDL)—together with Simple Object Access Protocol (SOAP)—are standards for describing services and their providers, as well as how services can be consumed in the implementation of web services in computer networks.

It would be beneficial to be able to analyze the service registry to determine the relationship between the different components and the services expressed in those components of a service based solution. Such an analysis helps to determine interdependencies between the components and their services as well as the composition of those services.

SUMMARY

Systems and methods of analyzing software systems are disclosed. In one example embodiment, a non-transitory computer readable storage medium stores one or more instructions that, when executed by a computer, cause the computer to perform a method of analyzing software systems having a plurality of components, a plurality of services each having one or more corresponding operations and a service registry. This example method includes finding the plurality of service components, the plurality of services and one or more corresponding operations in a service registry; exercising the found pluralities of components, services and the one or more operations to determine if one or more dependencies are present among the found plurality of components and the found plurality of services; and applying a fitness algorithm to the found plurality of services to determine a service composition of each service within the found plurality of services. A human readable output representative of the found pluralities of components, services and the one or more found corresponding operations, and any dependency determined to be present among the found plurality of components and the service composition of each service are then displayed on a user interface.

In another example embodiment, the method includes finding in a service registry a plurality of components, a plurality of services provided by each component in the plurality of components and at least one corresponding operation in each found service in the plurality of services; receiving a user input related to the one or more relationships among the found pluralities of components and services; exercising using the user input, the found pluralities of components, services and the at least one found corresponding operation to determine the one or more relationships among the found pluralities of components and services of the plurality of services including determining when one or more dependences among the found plurality of components are present; applying a fitness algorithm to an inventory of the found plurality of services to determine a level of service composition among the plurality of services; and displaying on a user interface, a human readable output representative of the found pluralities of components, services and the corresponding operations, and any dependencies determined to be present among the found plurality of components and a service composition of each found service.

BRIEF DESCRIPTION OF THE DRAWINGS

The above-mentioned and other features and advantages of the disclosed embodiments, and the manner of attaining them, will become more apparent and will be better understood by reference to the following description of the disclosed embodiments in conjunction with the accompanying drawings.

DETAILED DESCRIPTION

Figure 1:
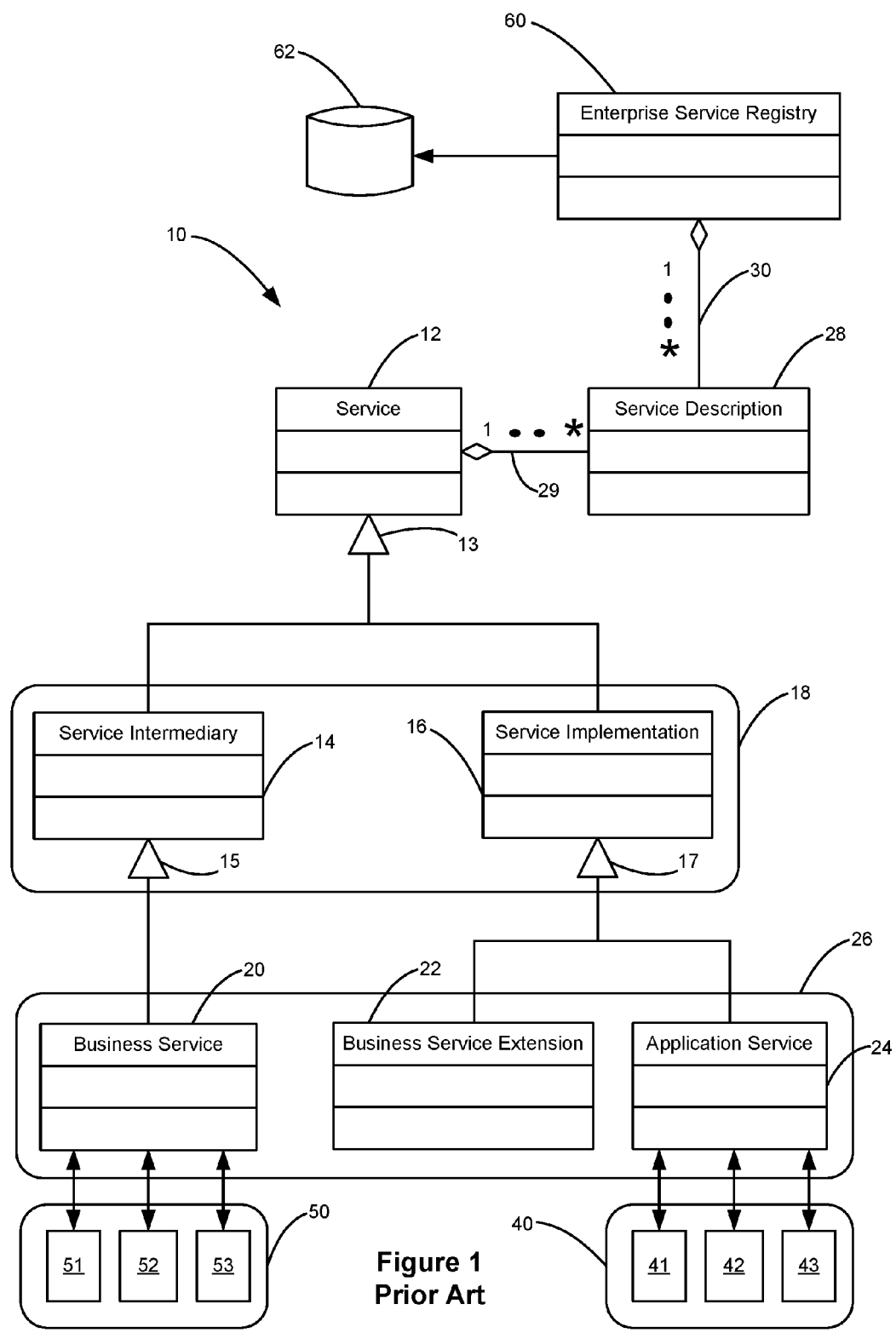
FIG. 1 is a prior art description of the structure of a service registry.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Terms such as "first", "second", and the like, are also used to describe various elements, regions, sections, etc. and are also not intended to be limiting. Like terms refer to like elements throughout the description. As used herein, the terms "having", "containing", "including", "comprising", and the like are open ended terms that indicate the presence of stated elements or features, but do not preclude additional elements or features. The articles "a", "an" and "the" are intended to include the plural as well as the singular, unless the context clearly indicates otherwise.

In addition, it should be understood that embodiments of the present disclosure may include both hardware and electronic components or modules that, for purposes of discussion, may be illustrated and described as if the majority of the components were implemented solely in software. As such, it should be noted that a plurality of hardware and software-based devices may be utilized to implement the invention.

It will be further understood that each block of the diagrams, and combinations of blocks in the diagrams, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus may create means for implementing the functionality of each block or combinations of blocks in the diagrams discussed in detail in the descriptions below.

These computer program instructions may also be stored in a non-transitory, tangible, computer readable storage medium that may direct a computer or other programmable data processing apparatus to function in a particular manner, such that the instructions stored in the computer readable storage medium may produce an article of manufacture including an instruction means that implements the function specified in the block or blocks. Computer readable storage medium includes, for example, disks, CD-ROMS, flash ROMS, nonvolatile ROM and RAM. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions specified in the block or blocks. Output of the computer program instructions, such as the process models and the combined process models, as will be described in greater detail below, may be displayed in a user interface or computer display of the computer or other programmable apparatus that implements the functions or the computer program instructions.

A process or workflow may be viewed as a sequence of steps or interactions that are performed to achieve a stated purpose or goal. A step or interaction may itself be a subprocess having its own sequence of steps or interactions. Social network models of a process or workflow may be visually represented by a combination of actors and transitions that show how a process or workflow is executed by one or more actors in a given system. Social network models may be a social structure that shows the interactions of the one or more actors with the process or with another actor or actors using transitions.

An actor may be a player or a performer in the process such as, for example, a user, a client, or other personnel that are involved in different activities in the process. For example, an actor may represent a user that accesses, performs and/or manages a given activity in the process or workflow. In some aspects, an actor may be a role, a business unit, a department, a team, an area or another group sharing a common function, attribute or goal. An actor label is an identifier that corresponds to the actor in a process model or workflow. An input actor is an actor that causes a process to transition from an event or operation to a subsequent event or operation that may be accessed by that actor or another actor, which may be referred to as an output actor. In alternative example embodiments, the input actor and output actor may be the same player which may occur in cases such as, for example, when two consecutive activities in the process are performed or managed by a single actor.

Transitions in a process model may illustrate the direction or movement between an input actor and an output actor. The input actor of a transition may correspond to an actor that leads the input actor to the output actor. The output actor of a transition may correspond to another actor that performs, accesses or manages an activity that occurs after the activity performed, accessed or managed by the input actor of the transition.

In a service based system or solution, a service provider involves different types of services that can act as an intermediate layer between the client and provider applications of the services. A service virtualization pattern focuses on the abstraction of technical details—such as service-endpoint location, policy enforcement, service versioning, and dynamic service-management information from service consumers—which access an intermediate service level. Technical concerns are managed at an implementation level, at which the actual business logic is implemented.

Types of service include: a business service (BS), which client applications use for accessing the functionality that is implemented in provider applications; an application service (AS), which can be consumed by a BS to access the functionality of the provider applications; and a business service extension (BSE), which can be consumed by a BS to operate on different AS responses and consolidate a single answer that is sent to a BS. In turn, the BS delivers the consolidated response to the client application.

FIG. 1 illustrates a prior art sample class diagram of objects of an enterprise service solution 10 and their corresponding relationships. In the hierarchical structure, Service object 12 is, as indicated by the triangle in connector 13 beneath it, the superior generalization of the type service object. Beneath service object 12 and connected to it via connector 13 are service intermediary object 14 and service implementation object 16 that are part of class 18 of objects that are virtualization pattern roles and are subtypes of service object 12. Business service object 20 is generalization subtype of the superior service intermediary object 14, as indicated by the triangle of connector 15, while BSE object 22 and AS object 24 are generalization subtypes of the superior, as indicated by the triangle of connector 17, service implementation object 18. BS object 20, BSE object 22 and AS object 24 are within class 26 of enterprise service types. Enterprise client, generally designated at 50, that provides and consumes services, interacts with BS object 20. Clients may be a user 51, a local application 52, or a network based application 53.

BS object 20 provides runtime policy rules while BSE object 22 orchestrates business functionality. AS object 24 interacts with one or more provider applications, generally designated 40, and, as illustrated, with provider applications 41-43. AS object 24 provides request/response adaptation services for data sent to and received from the provider applications 40.

Service description object 28 is an aggregation object of service object 12 which is in one to many (1 • • *) relationship with service description object 28 as indicated by the diamond on connector 29. Service description object 28 may provide information about categorization, versioning, state, trace location, etc., information on runtime rules, business functionality orchestration, request/response adaption, and calls to business functionality among BS object 20, BSE object 22 and AS object 24.

Service registry 60 is, as indicated by the diamond on connector 30, a superior hierarchical aggregation object to service description object 28 and is also in a one to many relationship with service description object 28. Service registry 60 organizes the description of the three different types of services and their relationships for one or more provider solutions 40 used in the enterprise. Client applications 50 and provider applications 40 interchange messages that are mediated by BS object 20, BSE object 22, and AS object 24. Service registry 60 manages, at the configuration level, the information that relates the different types of service. Service registry 60 is persisted in a service repository 62 and is used at runtime by BS object 20 to answer requests from one or more client applications 50. Data provided in service registry 60 includes service registry functionality, such as inquiry, publish, subscribe and other standard UDDI functionality, dependency management, runtime policy rules, versioning management, historical data management, etc. Service registry 60 may also provide service registry user interaction via a web application to users such as a business analyst, a solutions architect, an enterprise architect and an infrastructure architect. Service registry 60 may provide an information model such as a RDBMS. Service registry 60 organizes service type information and supports the interaction among enterprise client applications 50 that provide and consume services.

Services descriptions determine how services can be discovered and reused. A business service is described at a high level—often via textual descriptions in natural language and examples that facilitate understanding by business analysts. A business service extension and an application service typically contain more technical details. A business service is implemented by at least one application service and also might involve a business service extension. To associate a business service to one or more application services and/or business service extensions, a dependency mapping is created and managed by service registry 60. Table 1 describes in more detail the information that is managed by service registry 60.

The main attributes that describe a business service are shown at the beginning of Table 1. A BSE and an AS share attributes (see the middle of Table 1). The end of Table 1 describes binding information that relates a BS to a BSE to an AS. Information that describes services and is independent of any registry implementation is shown in the Service Information column, while information that is managed by the service registry 60 is shown in the Registry Information column. If information in the Service Information and Registry Information columns is the same, an X appears in the Replicated Information column.

TABLE 1

|  | Information | | |
|---|---|---|---|
|  | Service Information | Registry Information | Replicated Information |
| Business Service (BS) | | | |
| Service ID (Key used to access the service from client apps) |  | x |  |
| Service Name | x | x | x |
| Service Description (Text explaining the service and business information and business objective and applicable rules) |  | x |  |
| Input Messages (required to execute the service) |  | x |  |
| Output Messages (generated after service is executed including error messages) |  | x |  |
| Category (to which the service belong, e.g.BS based on business unit) |  | x |  |
| Application Service (AS) and Business Service Extension (BSE) | | | |
| Service Name | x | x | x |
| Service Description | x | x | x |
| Binding Information (technical information to access and execute service) | x | x |  |
| Operations (functionality implemented by the service) | x | x |  |
| Policies (Listing of applicable runtime policies such as timeout, bandwidth, debugging, etc.) |  | x |  |
| Category (to which the service belongs) |  | x |  |
| State (if service is active, inactive, or intermediate state) |  | x |  |
| Message In parameters | x | x |  |

TABLE 1-continued

|  | Information | | |
|---|---|---|---|
|  | Service Information | Registry Information | Replicated Information |
| Message Out response | x | x |  |
| Binding BS to AS & BSE |  |  |  |
| BS Name | x | x | x |
| AS and BSE Names | x | x | x |
| Message in: parameters MAP |  | x |  |
| Message out: response MAP |  | x |  |

Figure 2:
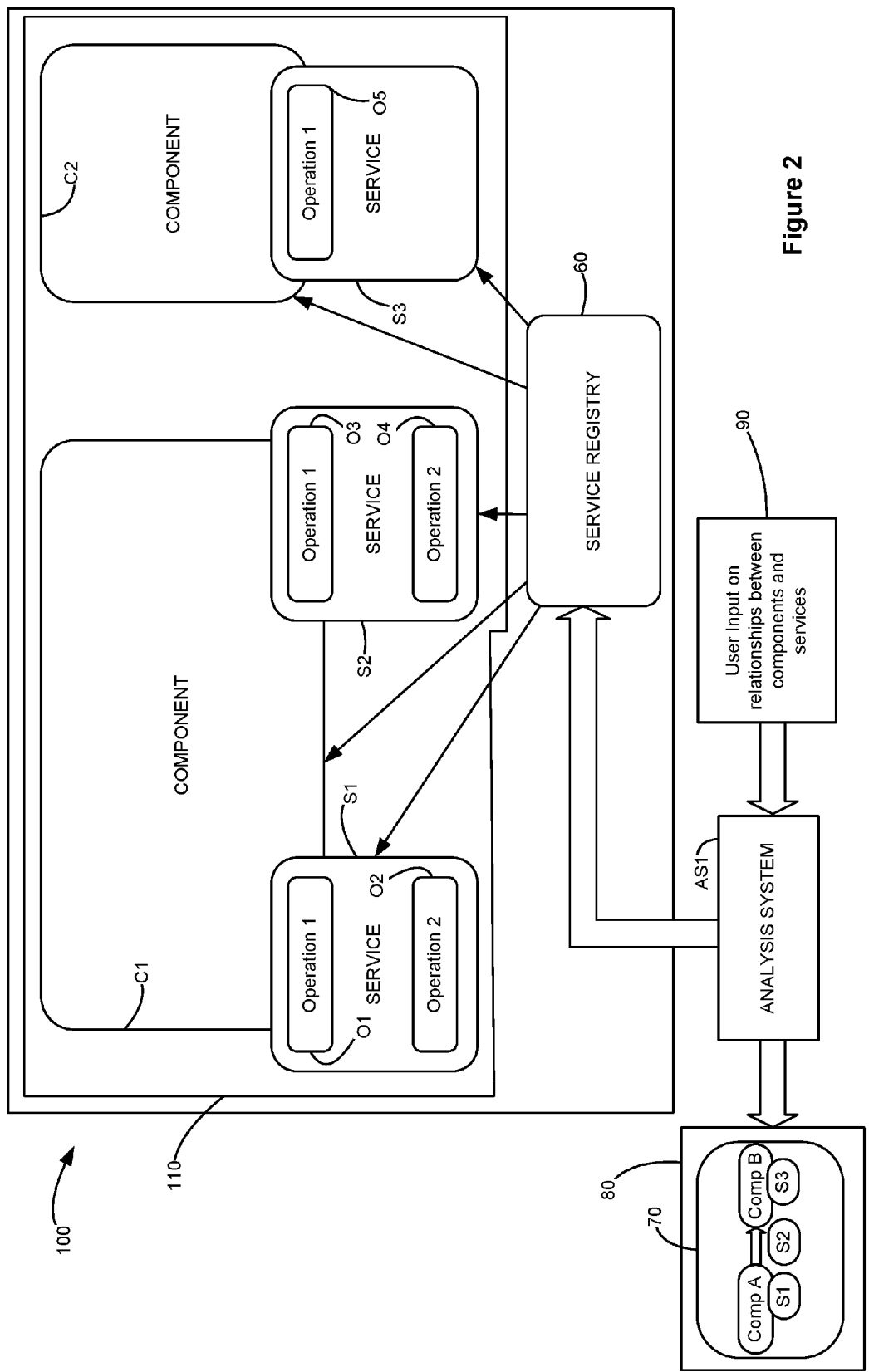
FIG. 2 is an overview of the relationship of an analysis tool of the present invention with a software system having a service registry.

FIG. 2 illustrates an overview of the present invention interrogating a service registry, such as service registry 60, in an example service based system 100 having a service provider 110 containing services that may be remotely accessed. Service provider 110 is shown consisting of two components C1, C2. Component C1 is shown providing services S1, S2. Component C2 is shown providing Service S3. Service S1 is shown providing two operations, O1, O2. Service S2 is shown providing two operations, O3, O4, and service S3 is shown providing operation O5. Components C1, C2, services S1-S3 and operations O1-O5 are registered with service registry 60 as indicated by the arrowheads therebetween.

In general a component provides one or more services and a service provides one or more operations. For example, a component class implements one or more multiple service interfaces each with one or more methods. Because services do not exist outside of a component, a service provides a "service contract" and a component is a fulfiller of that (and other) service contract. The capabilities of a service are defined within the service contract. Within service oriented solutions, a service contract represents the medium through which the services interact with each other or with other potential consumer programs.

An operation exists within a service and is analogous to a method on an interface. An operation is generally not shared between services. By composing two services, an operation in one service may be indirectly provided to the other. In service registry 60, the services, and the corresponding operations within those services map themselves with respect to the components. The service registry may be viewed as a matchmaker between the available services and the components which provide them. New components and their services (which include the operations contained therein) automatically register themselves in the service registry 60. The present method performed by analysis system AS1 utilizes services registries to interrogate services based systems.

While two components, three services and five operations are shown, it should be realized that this is only for purposes of illustration and not limitation. Service provider 110 may be a static structure that exists within system 100 or may be a dynamic structure that is created when needed.

Service Provider 110 may also be referred to as a "composite." Composites or service providers are deployed within a Service Component Architecture (SCA) system. A SCA system represents a set of services providing an area of business functionality that is controlled by a single organization. As an example, for the accounts department in a business, the SCA system might cover all financial-related functions, and it might contain a series of modules dealing with specific areas of accounting, with one for customer accounts and another dealing with accounts payable. To help build and configure the SCA system, composites can be used as component implementations, in the same way as Java classes. The SCA system allows a hierarchy of composites that is arbitrarily deep and such a nested model is termed recursive In a service provider, such as service provider 110, a component may be any component which provides an externally accessible API (Application Program Interface). A component may contain code implementing a business function. For example, in an financial system, one component may deal with customer accounts and other component may deal with accounts payable. Components may offer their functions as services, which can either be used by other components within the same module or which can be made available for use outside the module. Components may also depend on services provided by other components. These dependencies can either be linked to services provided by other components in the same module or can be linked to services provided outside the module, which can be provided by other modules.

For example, a Perceptive integration server, provided by Perceptive Software, of Shawnee, Kans., is a component which provides an externally accessible REST based (REpresentational State Transfer) API commonly used in a client-server environment. (REST compliant services manipulate XML representations of services using a uniform set of stateless operations.) The Perceptive integration server is a provider of document and workflow centric services such as: the ability to store a document with associated metadata; the ability to search for previously stored documents, the ability to retrieve previously stored documents; the ability to add stored documents to workflow queues; etc. These services are accessible to clients via its API. As is known to one of ordinary skill in the art, there are many specific types of APIs all of which are used by components to provide one or more services to other components.

A service is an application function packaged as a reusable element for use in a business process. A service either provides information or facilitates a change to business data from one valid and consistent state to another. The process used to implement a particular service does not matter. Through defined communication protocols, services can be invoked that stress interoperability and location transparency. A service has the appearance of a component, in that it looks like a self-contained function from the service requester's perspective. However, the service implementation may actually involve many steps executed on different computers within one enterprise or on computers owned by a number of business partners. A service might or might not be a component in the sense of encapsulated software. Like a class object, the requester application is capable of treating the service as one. A service has a specification or description that consists of: (1) an explicit and detailed narrative definition supported by a low-level (not implementation-specific) process model (the narrative definition is, in some cases, augmented by machine-readable semantic information about the service that facilitates service mediation and consistency checking of an enterprise architecture); (2) a set of performance indicators that address measures and performance parameters, such as availability (when should members of the organization be able to perform the function), duration (how long should it take to perform the function), rate (how often will the function be performed over a period of time), etc.; and (3) a link to the organization's information model showing what information the service owns (creates, reads, updates, and deletes) and which information it references that is owned by other services.

Services can be stateless and stateful. Stateful and stateless are adjectives that describe whether a service is designed to note and remember one or more preceding events in a given sequence of interactions with a user, another computer or service, a device, or other outside element. Stateful means the service keeps track of the state of interaction, usually by setting values in a storage field designated for that purpose. Stateless means there is no record of previous interactions and each interaction request has to be handled based entirely on information that comes with it. Stateless services may "broker" or aggregate responses of other services but this is independent of being stateless. An example of the difference is how a stateful and a stateless service may handle user authentication. A stateful service will accept user credentials and validate them and establish a session for the user. All subsequent requests will be made in the context of that session and the server will associate those requests with a particular session. On the other hand, a stateless service will validate the authenticity of each request. A user may acquire an authentication token but they must pass it to the server on every request. Stateful services generate their response by executing business logic on their states stored in a persistent store. While services should not be dependent on the context or state of other services, when dependencies are required, they are best defined in terms of common business processes, functions, and data models, rather than implementation artifacts (like a session key).

In FIG. 2, analysis system AS1 is shown in communication with service registry 60 to determine the components, services and operations that are registered. This communication may occur though a network. Analysis system AS1 is also shown providing a system representation 70 that is shown being presented on a user interface 80. Analysis system AS1 also receives user input 90 related to components and services in service provider 110. Analysis system AS1 performs the methods described hereinafter.

Figure 3:
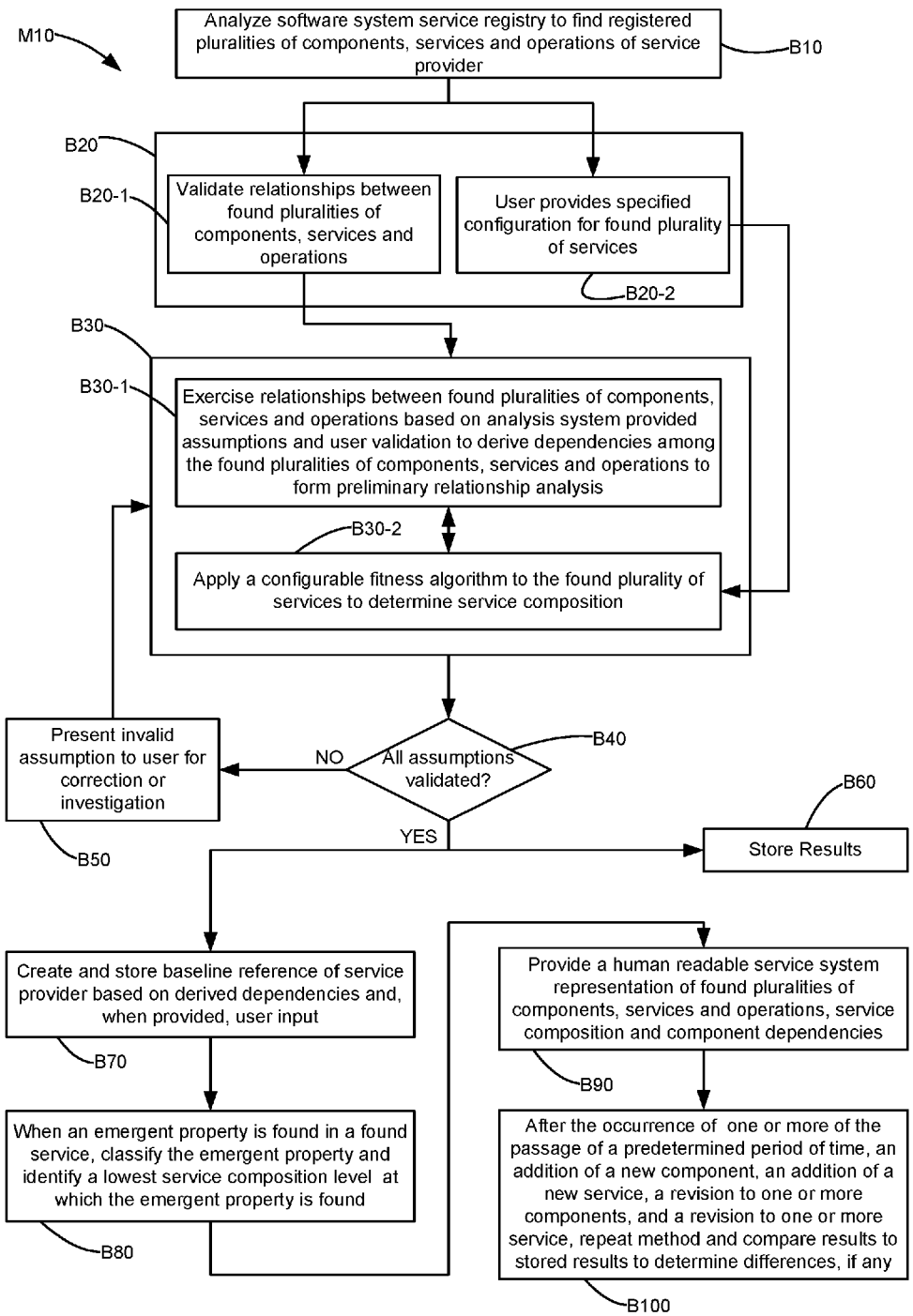
FIG. 3 is a high level flow diagram of one example of the present method.

FIG. 3 illustrates an example high level version of a method, method M10 performed by analysis system AS1. Analysis system AS1 may be implemented in hardware, software or a combination of hardware and software. At block B10 analysis system AS1 analyzes a service registry, such as service registry 60, to find pluralities of registered components, such as components C1, C2, services, such as services S1-S3, and operations, such as operations O1-O5, forming one or more service providers, such as service provider 110. The first time that analysis system inspects a service registry it will be looking for services that produce data that can be consumed by other services. This is a form of a derived dependency. These relationships are discovered at block B10.

At block B20 two operations are illustrated. At sub-block B20-1, user validation of the relationships found in block B10 is provided to analysis system AS1 for use in the operations occurring at to block B30. Also at sub-block B20-2, user provided specific configurations for the found plurality of services is provided to the configurable fitness algorithm found at sub-block B30-2.

Relationships may be viewed as obvious or unobvious and understanding the concept of an unobvious relationship may be best explained by approaching it from the concept of an obvious relationship. There are many obvious relationships between services in a service registry. For example for a Perceptive integration server used for electronic content management, analysis system AS1 would discover relationships between the many document related services provided by the Perceptive integration server. These relationships are known and expected because they are defined in the API of the Perceptive integration server. However, a benefit of analysis system AS1 is its ability to find potential "unobvious relationships" between disparate services that may lead to increases in business efficiency. For example, during the finding of the plurality of services from analyzing the service registry, analysis system AS1 discovers the presence of a capable telephony API in the service registry along with the Perceptive integration server API. Analysis system AS1 would discover, when comparing the Perceptive integration server's API with the telephony API, new capabilities such as being able to fax or being able to call customers. Analysis system AS1 would present these new "unobvious" relationships—call a customer, fax a customer—to the user for validation as a potential relationship as described at block B80. As is known in the art, to use these new services, a workflow process may be used to provide business rules on these new capabilities of calling or faxing customers.

At block B30 several operations occur. At sub-block B30-1, analysis system AS1 exercises the relationships between the found pluralities of components, service and operations to derive dependencies among the components, services and operations based on analysis system provided assumptions. The term "exercises" is used to convey the idea of applying analysis heuristics against an API. In general, the term "exercises" or "exercising" is meant to indicate that the analysis system AS1 is actually be making live API calls against an operation and then analyzing the result before trying a new set of parameters. During the exercising, analysis system AS1 may make assumptions regarding the found plurality of services. Method M10 will analyze the behavior of all the operations provided by the services under different parameters. From this analysis, method M10 will make assumptions about the type of facility actually provided by a particular service. Method M10 will then test out those assumptions until method M10 is able to make a reasonable determination about the functionality provided by an operation of a service. At sub-block B30-2, a configurable fitness algorithm is applied to each service within the found services.

At block B40, a determination is made to see if the assumptions have been validated as a result of the operations found in block B30. When it is determined that the there are one or more assumptions that have not been validated, at block B50, the one or more invalid assumptions are presented to a user for correction or investigation. After correction, the corrected one or more assumptions are provided for use in the operations performed at block B30. When it is determined that the assumptions have been validated, the results are stored at block B60 and a user may be presented with preliminary analysis about the found relationships between the found pluralities of components and services.

At block B70, analysis system AS1 creates a baseline reference of the service provider based on the derived assumptions and found dependencies, and, when provided, the user input. When the baseline reference is created, it may be used to determine the future behavior of the service provider when revisions are made, on the occurrence of functional failures, and performance anomalies, etc.

At block B80, emergent properties, if any are found in the service after the fitness algorithm is applied, are classified and the lowest composition level at which the emergent properties are found is identified. For example, where a service, such as service S2 is composed of another service, such as service S3, the level at which the emergent property is found can be either in the level containing service S3 or in the level containing service S2. Emergent properties may, or may not be interpreted as a problem. As components of a composite system evolve, a new behavior can emerge. This new behavior may not be a problem, but may be a symptom of an underlying problem. Emergent properties may be a problem but not all problems are emergent properties. Performance characteristics of a system is an example of emergent properties that the analysis system AS1 would analyze. This would only pose a problem if the performance of the system is degraded, in which case, the analysis system AS1 would be used to figure out why the performance has degraded, and, where in the service the emergent property arises.

At block B90, analysis system AS1 provides a human readable service system representation of the found pluralities of components, services and operations along with composition of each service and dependencies. An example output provided by analysis system AS1 of solution provider 110 of FIG. 2 is described infra with respect to FIG. 5.

Individual changes in system composition, such as newer versioned components and services, can additionally be tracked to determine changes in emergent properties introduced or eliminated by the system change. This tracking would be done over time by analyzing the results of successive scans of service registry 60 and comparing the signatures and behavior of individual and composed services over time. This effectively determines any differences in the properties and states of the solution provider, such as solution provider 110. This is illustrated at block B100 when, on the occurrence of at least one of a passage of a predetermined period of time, an addition of a new component, an addition of a new service, a revision to one or more components, and a revision to one or more services, the exercising the pluralities of components, services and operations and applying the fitness algorithm to the found services occurs is re-performed and a comparison of the results of the re-performed analysis with the stored results is done to determine if one or more changes have occurred.

A feature of the present method is the ability to discover the relationship between the found plurality of services and the found plurality of components. Relationships between services are best described by service composition. Service composition can expose relationships by requirement, or by usage as explained infra. If two services exhibit similar behavior given similar input, they are candidates for service composition analysis. Levels of service composition are a non-composed service, a partially composed service, or a completely composed service.

A non-composed service uses only "primitive" or simple types and may return a system specific type. Alternatively, a non-composed service may be described as being able to be completely broken down as a composition unit into an atomic piece with no external dependencies. A partially composed service uses both "primitive" types and system specific types. Alternatively, a partially composed service may be described as a service with one or more external dependencies which cannot be analyzed by the analysis system AS1, and one or more external dependencies which can be broken down. A completely composed service uses only system specific types. Alternatively, a fully composed service may be described as a service that relies entirely on one or more external dependencies which cannot be analyzed and which prevents granular analysis of the service.

In service composition by requirement, a service operation may, as a prerequisite, explicitly require the usage of another service. For example, a service operation may require, as a parameter, a value that must obtained by calling an operation on a separate service. This service is in effect composed of two services.

An example of service composition by requirement of a non-composed service is:
User::Create_User=>Username: "username", Password: "password"

This example service operation provides the facility for creating a user and will return a user object upon completion. It only requires two simple types Username: and Password:.

An example of service composition by requirement of a partially composed service is:
Print_Document=>User: user, Document: doc, Copies: 2

This example service operation provides the facility for printing a document. It requires two system specific types, Document: and Copies: and one simple type, User:.

An example of service composition by requirement of a completely composed service is:
Location::Move_Document=>(Document: doc, Location: location)

In this example, the service operation provides a facility that allows an actor to move a document from one location to another. It requires two system specific types, Document: and Location:.

A service composition by usage may utilize operations from other services to complete the requested operation. A example of a service composition by usage of a non-composed service is:
Service 1—Operation 1: number::add=>num1: 20, num2: 30
Service 1—Operation 2: number::divide=>dividend: 10, divisor: 2

This example service provides two atomic operations, add and divide. This is a non-composed service because it does not rely on other services to provide its operations.

A example of a service composition by usage of a partially composed service is:
Service 2 Operation 1: number::summation=>List<number>
Service 2 Operation 2: number::median=>List<number>

Service 2 provides in Operation 1 an operation, summation, which calls the add operation in Service 1, Operation 1 immediately above. It also provides an operation, median, in Service 2, Operation 2 that does not utilize any other services. As such this service is partially composed.

An example of service composition by usage of a fully composed service is: Service 3: number:: average=>List<number>

Service 3 provides an operation average that calls both the add and divide operations from Service 1, Operation 1 and Service 1, Operation 2, respectively. As such it is fully composed.

The following provides examples of a non-composed service, a partially composed service and a fully composed service as applied to a multifunction device provided in a network, the device having scanning and printing capabilities. It should be noted that the OCR service may be provided on the multifunction device or be provided elsewhere on the network apart from the scanning and printing services.

A non-composed service example is: Scan a Page:. This non-composed service uses the device to read image data from a physical representation. Another example of a non-composed services is: Print a Page:. This service uses the device to take image data and form a physical representation. A partially composed service example is: OCR a Document:. This partially composed service composes the Scan service to read page data and then performs an OCR operation on that data. A fully composed service example is: Copy a Document:. This uses the Scan service and the Print service to create copies of a document.

Method M10 is evolutionary in its approach as it learns from application of assumptions it makes about relationships between components to build and test assumptions at different levels of service composition, as well as in application to other software systems which utilize components and services which it has already learned.

Service composition by usage is best discovered by behavioral analysis. Method M10 will make assumptions about the behavior that should be exhibited by two services given the same input and it will then test the assumptions to determine if they are valid. Service composition exhibited by requirement is more demonstrable by service signature but method M10 will make assumptions that this operation on this service produces the type required by this service. It will then test those assumptions.

Figure 4:
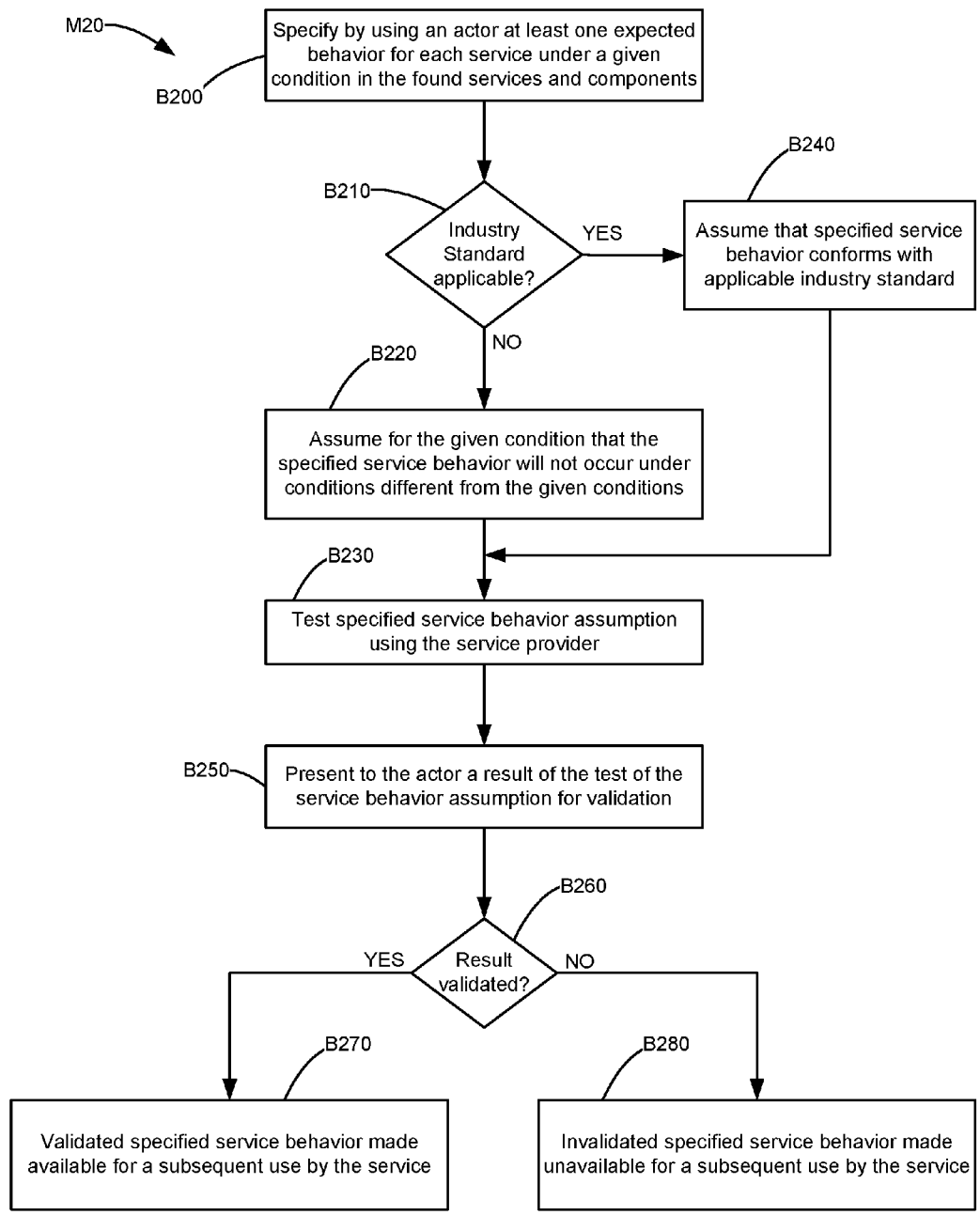
FIG. 4 is a flow diagram of a configurable fitness algorithm.

The fitness algorithm provides a mechanism for applying configurable and learned behavior against actual services. FIG. 4 illustrates a configurable fitness algorithm. After a list of services, and service components has been obtained by the system, the fitness algorithm, label M20, may be implemented. At block B200, an expected behavior for a given condition is specified for each service in the found services and components. An example specification for a user logon service may be:
Given Condition: A user with valid credentials;
When: The user passes their credentials the system;
Expected Behavior: The user is issued a valid authentication token.

At block 210 a determination is made to see if an industry standard is involved with the service. When a determination is made that an industry standard is involved, then, at block B240, it will be assumed that the specified service behavior conforms with the applicable industry standard. For example,
Given Condition: POST request made;
When: a POST request has been successfully executed against a RESTful web service;
Expected Behavior: a 201 HTTP status code (i.e., the request has been fulfilled and resulted in a new resource being created) should be returned.

Another example is when a GET request with an Accept header of "application/xml" has been sent to a RESTful web service, the assumed response by the server should be with a Content-Type header of "application/xml" and XML in the body. A source of such industry standards is the World Wide Web Consortium (W3C) which is a primary international standards organization for the world wide web. W3C standards include: CSS; DOM; GRDDL; HTML; MathML; OWL; P3P; RDF; SISR; SKOS; SMIL; SOAP; SPARQL; SRGS; SSML; SVG; VoiceXML; XHTML; XHTML+Voice; XML; XML Events; XML Information Set; XML Schema; XPath; XQuery; XSL-FO; XSLT; WCAG; WSDL; and XForms. An industry standard, as used here, also includes any public standard related to network operation and communication protocols. The fitness algorithm proceeds to block B230.

At block B210, when a determination is made that an industry standard is not involved then, at block B220, then it will be assumed that the specified service behavior under given conditions will not occur or be exhibited by that service under conditions different from the given conditions. An example of a non-industry standard explicit specification is:
Given Condition: A user with access to a workflow queue;
When: A document enters the workflow queue;
Expected Behavior: The user may view the document (explicit assumption).

Some specifications may be inferred or assumed. For the immediately previous example, analysis system AS1 will also assume or infer that if a user does not have access to the workflow queue then they cannot view the document.

There may be one or more of these specifications per operation. Once entered, analysis system will execute the specifications. At block B230, analysis system AS1 will then test the specified service behavior assumption using the service provider 110. At block B250, analysis system AS1 will report the result of the of the service behavior assumption for validation by the actor. At block 260, a determination is made to see if the test result has been validated. When it is determined that the service behavior has been validated, then, at block B270, the validated service behavior is made available for subsequent uses of the service. When it is determined that the service behavior has not been validated, then, at block B280, the invalidated service behavior is not made available for subsequent uses of the service. An example of the output given to the actor would be:
Given Condition: A user with access to a workflow queue;
When: A document enters the workflow queue;
Expected Behavior: The user may view the document;
Actual Behavior: The user is able to view the document.

The fitness algorithm allows the application of a common standard of behavior across any RESTful web service. For example, when a new resource (component, service or operation) is created, one can generically assert that the server return a 201 status code (a new resource successfully created) to the requesting client, or, when the server is deleting a resource, that the server return a 204 status code (the server successfully processed the request but is not returning any content) to the requesting client. Status codes are defined in Hypertext Transfer Protocol (HTTP) Standard 1.1. Similarly, the server will respect an Accept header in a uniform manner across all of the applications. These specified behaviors can be configured in one place and executed across any RESTful web service.

Figure 5:
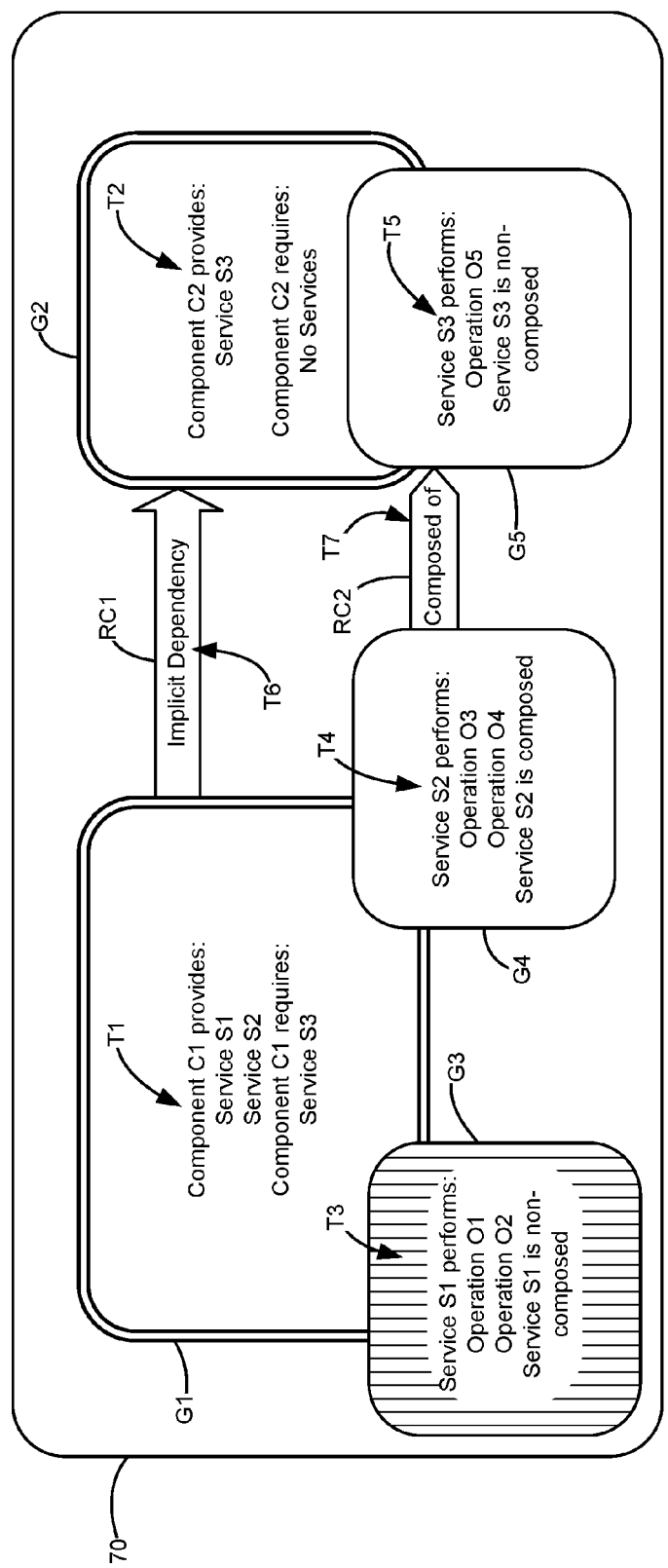
FIG. 5 is an example human readable output providing an analysis of a software system having service components illustrated in FIG. 2.

With reference to FIG. 5, system representation 70 is a human readable representation of the components, services and operations in the service provider 110 showing component interdependencies, such as those between components C1 and C2 together with the level of composition of services S1-S3 in service solution 100. The human readable output may be a text element, a graphic element, unanimated or animated, or a combination of text and graphic elements. FIG. 5 illustrates the use of both graphic and text elements. Graphic element G1 illustrates the used of line type, a double line as shown, to distinguish between types of software elements. For example a double line block may be used for components while a single line block may be used for services. Similarly, the color of a graphic element may be used to distinguish software elements. Graphic element G3 is vertically lined to illustrate the use of the color red as a means to distinguish a service from a component.

After performing method M10 on service provider 110 of FIG. 2, analysis system AS1 has determined the following. There are two components C1 and C2. Component C1 provides services S1, S2 while requiring service S3. Component C2 provides service S3. Service S1 provides operations O1, O2 and is non-composed. Service S2 provides operations O3, O4 and is composed while service S3 provides operation O5 and is non-composed. Service S2 is composed of service S3. Component C1 is dependent on Component C2.

In FIG. 5 a graphic element in the form of a block represents a component and a service. Graphic element G1 represents component C1 and graphic element G2 represent component C2. Within graphic elements G1, G2 are corresponding text elements T1, T2. Text element T1 provides information relating to component C1. As shown, text element T1 states that component C1 provides services S1, S2 and requires service S3 while text element T2 states that component C2 provides service S3 and requires no other services.

Overlaying graphic element G1 are graphic elements G3, G4 representing services S1 and S2. Graphic elements G3, G4 are shown overlaying graphic element G1 to indicate the relationship of services S1, S2 to component C1, i.e., component C1 provides services S1, S2. Similarly, graphic element G5, representing service S3 overlays graphic element G2 to show the relationship between service S3 and component C2, i.e., component C2 provides service S3. Shown within graphic elements G3, G4, G5 are respective text elements T3, T4, T5. Text element T3 provides the list of operations available in service S1, namely operations O1, O2 and states that the level of composition is non-composed. Text element T4 provides the list of operations available in service S2, namely operations O3, O4 and that the level of composition is composed. Text element T5 provides the list of operations available in service S3, namely operation O5, and that the level of composition is non-composed.

A relationship connector RC1 is positioned between graphic elements G1 and G2 to indicate the relationship between their corresponding components C1, C2 that they represent. As shown, relationship connector RC1 is an arrow with its tail beginning at graphic element G1 and head pointing at graphic element G2. Provided in relationship connector RC1 is a text element T6 indicating that there is an implicit dependency by component C1 on component C2. While a text element may be provided in relationship connector RC1, the shape and direction of the relationship connector RC1, the arrow, alone may be used to convey that component C1 is dependent on component C2. Hence relationship connector RC1 may be termed a dependency connector.

A second relationship connector RC2 is shown placed between graphic elements G4 and G5. Second relationship connector RC2 is of a different shape than relationship connector RC1 and is used to show the composition of service S2. As shown relationship connector RC2 is a pennant or flag shape with the tail beginning at graphic element G4 and its head pointing to graphic element G5. Relationship connector RC2 is shown with a text element T7 to indicate its meaning that service S2 is composed of service S3. While a text element may be provided in connector C2, the shape of connector C2, again the flag, alone may be used to convey that component C1 is dependent on component C2. Hence connector C1 may be termed a dependency connector. If it is desired to distinguish between composition by requirement and composition by usage another relationship connector may be used. For example, a flat tailed flag shape may be used to indicate composition by requirement while a split tailed flag shape may be used to indicate composition by usage.

While graphic elements are presented in human readable output 70, the same information may be conveyed using only text elements. The shapes of the graphic elements and the relationship connectors is a matter of design choice and is not a limitation of the method. So to the text and text arrangement within a text element is a matter of design choice and is not a limitation of the method.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A non-transitory computer readable storage medium storing one or more instructions that, when executed by a computer, cause the computer to perform a method of analyzing a software system having a plurality of components, a plurality of services each having one or more corresponding operations and a service registry, the method comprising:

finding the plurality of components, the plurality of services and the one or more corresponding operations in the service registry;

exercising the found pluralities of components, services and the one or more operations to determine if one or more dependencies are present among the found plurality of components and the found plurality of services;

applying a fitness algorithm to the found plurality of services to determine a service composition of each service within the found plurality of services; and displaying, on a user interface, a human readable output representative of the found pluralities of components, services and the one or more found corresponding operations, and any dependency determined to be present among the found plurality of components and the service composition of each service.

2. The non-transitory computer readable storage medium of claim 1, wherein the one or more instructions to apply the fitness algorithm includes one or more instructions to:

for each service in the found plurality of services:

specify, by using an actor, at least one expected behavior;

determine whether or not an industry standard is applicable with the service, and, on determining that the industry standard is applicable with the service, assume that the at least one specified service behavior conforms with the applicable industry standard, and, on determining that the industry standard is not applicable with the service, assume that for one or more given conditions that the specified service behavior will not occur under conditions different from the one or more given conditions;

test the specified service behavior assumptions in a service provider;

display, on a user interface, a result of the testing for validation by the actor; and determine whether or not the result is valid, and, upon determining that the result is valid, validate the specified service behavior and make the validated specified service behavior available for subsequent uses of the service.

3. The non-transitory computer readable storage medium of claim 2, further comprising one or more instructions to, upon the determining that the result is invalid, invalidate the specified service behavior and to make the invalidated specific service behavior unavailable for a subsequent use by the service.

4. The non-transitory computer readable storage medium of claim 1, wherein the human readable output comprises a plurality of text elements describing the found pluralities of components, services and the one or more found corresponding operations, any dependency determined to be present among the plurality of components and the level of service composition of each service in an inventory of the plurality of services.

5. The non-transitory computer readable storage medium of claim 1, further comprising one or more instructions to:
store one or more results of the exercising of the found pluralities of components, services and the one or more found corresponding operations; and
on the occurrence of at least one of a passage of a predetermined period of time, an addition of a new component, an addition of a new service, a revision to one or more found components, and a revision to the found plurality of services, reperform the finding the pluralities of components, services and the one or more corresponding operations, exercise a newly found pluralities of components, services and the one or more newly found corresponding operations and apply the fitness algorithm to the newly found plurality of services; and
compare the one or more results of the exercising of the newly found pluralities of components, services and the one or more newly found corresponding operations and application of the fitness algorithm to the newly found plurality of services with the stored one or more results to determine if one or more changes have occurred.

6. The non-transitory computer readable storage medium of claim 1, wherein the human readable output comprises a plurality of graphic elements describing the found pluralities of components, services and the one or more found corresponding operations, any dependency and service composition wherein, when one or more found services are provided by a component, the one or more found services are indicated by the plurality of graphic elements for the one or more found services adjoining the graphic element for the component providing the one or more found services.

7. The non-transitory computer readable storage medium of claim 6, wherein the plurality of graphic elements for describing any dependency determined to be present, the plurality of graphic elements describing the found plurality of components and the plurality of graphic elements describing service composition are different from one another.

8. The non-transitory computer readable storage medium of claim 1, wherein the human readable output comprises a plurality of graphic elements including corresponding text elements describing the found pluralities of components, services and the or more found corresponding operations and a first relationship connector type for indicating any dependency present between at least two components of the found plurality of components and a second relationship connector type indicating service composition between at least two services of the found plurality of services.

9. The non-transitory computer readable storage medium of claim 8, wherein the second relationship connector type includes a second connector type indicating any composition by requirement between at least two services of the found plurality of services and a second connector type indicating any composition by use between at least two services of the found plurality of services and having a visual appearance that is different from the second connector type indicating any composition by requirement.

10. A non-transitory computer readable storage medium storing one or more instructions that, when executed by a computer, cause the computer to perform a method of analyzing a software system having a plurality of components, a plurality of services with each service having at least one operation and a service registry, the method comprising:
finding in the service registry the plurality of components, the plurality of services provided by each component in the plurality of components and at least one corresponding operation in each found service in the plurality of services;
receiving a user input related to one or more relationships among the found pluralities of components and services;
exercising, using the user input, the found pluralities of components, services and the at least one found corresponding operation to determine the one or more relationships among the found pluralities of components and services of the plurality of services including determining when one or more dependencies among the found plurality of components are present;
applying a fitness algorithm to an inventory of the found plurality of services to determine a level of service composition among the plurality of services; and
displaying, on a user interface, a human readable output representative of the found pluralities of components, services and the corresponding operations, and any dependencies determined to be present among the found plurality of components and a service composition of each found service.

11. The non-transitory computer readable storage medium of claim 10, wherein the one or more instructions to apply the fitness algorithm to the inventory of the found plurality of services includes one or more instructions to:
for each service in the found plurality of services:
specify, by using an actor, at least one expected service behavior for a given condition;
determine whether or not an industry standard is applicable with the service, and,
on determining that the industry standard is applicable with the service, assume that the specified at least one expected service behavior conforms with an applicable industry standard, and,
on determining that the industry standard is not applicable to the service, assume that for a given condition that the specified at least one expected service behavior will not occur under conditions different from the given condition;
test the specified at least one expected service behavior in a service provider;
display, on a user interface, a result of the testing for validation by the actor; and
determine whether or not the result is valid, and, upon determining that the result is valid, validate the specified at least one expected service behavior and make the validated specified at least one expected service behavior available for a subsequent use by the service, and, upon determining that the result is invalid, invalidate the specified at least one expected service behavior and make the invalidated specific at least one expected service behavior unavailable for a subsequent use by the service.

12. The non-transitory computer readable storage medium of claim 10, wherein the human readable output comprises a plurality of text elements describing the found pluralities of components, services and the at least one found corresponding operations, any dependency found among the found plurality of components and the level of service composition of each service in the found plurality of services.

13. The non-transitory computer readable storage medium of claim 10, further comprising one or more instructions to:
store one or more results of the exercising the found pluralities of components, services and the at least one found corresponding operations;
on the occurrence of at least one of a passage of a predetermined period of time, an addition of a new component, an addition of a new service, a revision to the plurality of components, and a revision to one or more of the found plurality of services, reperform the finding and exercise a newly found pluralities of components, services and at least one newly found corresponding operation and apply the fitness algorithm to the newly found plurality of services; and
compare the results of the exercising the newly found pluralities of components, services and the at least one newly found corresponding operation and the applying the fitness algorithm to the newly found plurality of services with the stored results to determine if one or more changes have occurred in at least one of one of the newly found pluralities of components and services.

14. The non-transitory computer readable storage medium claim 10, wherein the human readable output comprises a plurality of graphic elements describing the found pluralities of components, services and the at least one found corresponding operation, any dependency determined to be present and service composition wherein, when one or more found services are provided by a found component, the one or more found services are indicated by the plurality of graphic elements, the one or more found services adjoining the graphic element for the found component providing the one or more found services.

15. The non-transitory computer readable storage medium of claim 14, wherein the plurality of graphic elements for describing any dependency determined to be present, the plurality of graphic elements describing the found plurality of components and the plurality of graphic elements describing service composition are different from one another.

16. The non-transitory computer readable storage medium of claim 10, wherein the human readable output comprises a plurality of graphic elements including corresponding text elements describing the found pluralities of components, services and the at least one found corresponding operation and a first relationship connector type for indicating any dependency found present between at least two components of the found plurality of components and a second relationship connector type indicating service composition between at least two services of the found plurality of services.

17. A non-transitory computer readable storage medium storing one or more instructions that, when executed by a computer, cause the computer to perform a method of analyzing a software service provider having a plurality of service components, a plurality of services each having one or more corresponding operations, and a service registry, the method comprising:
finding the plurality of components, the plurality of services and the one or more corresponding operations in the service registry;
discovering the relationship between the pluralities of found components and found services and the one or more found corresponding operations;
validating relationships discovered among the plurality of found components, the plurality of found services and the one or more found corresponding operations;
providing a specified configuration for each found service in the plurality of found services;
exercising the found pluralities of components and services using the specified configuration and the one or more corresponding operations and the relationship validation to determine whether or not one or more dependencies are present between the plurality of found components, between the plurality of found services and between the pluralities of found components and found services;
applying a fitness algorithm to the plurality of found services using the specified configuration for each found service to determine a service composition of each found service;
determining whether or not the one or more system assumptions have been validated and, when it is determined that at least one assumption of the one or more system assumptions is invalid, presenting the at least one invalid assumption to a user for correction and then repeating the exercising, the applying, and the determining; and, when it is determined that the one or more system assumptions are valid, storing results of the exercising and the applying;
creating and storing a baseline reference of the software service provider based upon the one or more dependencies determined to be present and, when provided, user input; and,
displaying, on a user interface, a human readable output representative of the software service provider, said output including the pluralities of found components and found services and the one or more found corresponding operations, the one or more dependencies determined to be present and the service composition of each found service.

18. The non-transitory computer readable storage medium of claim 17, wherein the exercising and applying are done in a recursive manner.

19. The non-transitory computer readable storage medium of claim 17, further comprising one or more instructions to, when an emergent property is found in a found service, classify the emergent property and identify a lowest service composition level at which the emergent property is found.

* * * * *